United States Patent
Tibbits et al.

(10) Patent No.: US 10,633,772 B2
(45) Date of Patent: Apr. 28, 2020

(54) ACTIVE WOVEN MATERIALS

(71) Applicant: Massachusetts Institute of Technology, Cambridge, MA (US)

(72) Inventors: Skylar J. E. Tibbits, Boston, MA (US); Dimitrios Mairopoulos, Dionisos (GR); Jared Smith Laucks, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 128 days.

(21) Appl. No.: 15/870,692

(22) Filed: Jan. 12, 2018

(65) Prior Publication Data

US 2018/0195213 A1 Jul. 12, 2018

Related U.S. Application Data

(60) Provisional application No. 62/445,503, filed on Jan. 12, 2017.

(51) Int. Cl.
*D03D 15/00* (2006.01)
*F03G 7/06* (2006.01)
(Continued)

(52) U.S. Cl.
CPC ............. *D03D 15/00* (2013.01); *D03D 15/04* (2013.01); *D04B 1/00* (2013.01); *F03G 7/06* (2013.01);
(Continued)

(58) Field of Classification Search
CPC .... D03D 13/004; D03D 17/00; D03D 13/008; D03D 15/00; D03D 15/04; D03D 3/00;
(Continued)

(56) References Cited

U.S. PATENT DOCUMENTS 529,719 A 11/1894 Eils
2,104,742 A 1/1938 Fleischer
(Continued)

FOREIGN PATENT DOCUMENTS

AT 006 615 UI 1/2004
DE 20 2008 015 143 U1 3/2009
(Continued)

OTHER PUBLICATIONS

3D Printing (Photolithography), MRSEC Education Group, University of Wisconsin-Madison. Accessed: Nov. 23, 2016.
(Continued)

*Primary Examiner* — Robert H Muromoto, Jr.
(74) *Attorney, Agent, or Firm* — Hamilton, Brook, Smith & Reynolds, P.C.

(57) ABSTRACT

Active fabrics typically include a plurality of fibers. At least one of the fibers exhibits a change in length or width upon exposure to an external stimulus, such as heat, moisture, or light. The active woven materials can exhibit local transformation, such as creating areas that are tighter or more open, or global transformation, such as changing from flat to curled. The effect is a precise and repeatable change in shape upon exposure to an external stimulus. Embodiments can be employed, for example, in sportswear, compression garments, furniture, and interior products.

10 Claims, 5 Drawing Sheets

(51) Int. Cl.
*D04B 1/00* (2006.01)
*D03D 15/04* (2006.01)
*B32B 5/02* (2006.01)

(52) U.S. Cl.
CPC . *D03D 2700/0137* (2013.01); *D10B 2401/02* (2013.01); *D10B 2401/046* (2013.01); *D10B 2401/10* (2013.01); *D10B 2401/20* (2013.01)

(58) Field of Classification Search
CPC ...... C22F 1/006; C22F 1/00; B32B 2311/005; B32B 33/00; B32B 2255/02; B32B 2255/102; B32B 2255/26; B32B 2307/724; B32B 27/40; B32B 5/26; D04B 1/00; D06B 19/00; D10B 2401/046; D10B 2403/0114; D10B 2403/0112
See application file for complete search history.

(56) References Cited

U.S. PATENT DOCUMENTS

| | | |
|---|---|---|
| 2,414,716 A | 1/1947 | Carson |
| 2,490,586 A | 12/1949 | Embree |
| 2,680,501 A | 6/1954 | Cunningham |
| 2,765,159 A | 10/1956 | Garofalo |
| 3,081,514 A | 3/1963 | Griswold |
| 3,125,195 A | 3/1964 | Moore |
| 3,389,451 A | 6/1968 | Speca et al. |
| 3,391,048 A | 7/1968 | Dyer et al. |
| 3,468,748 A | 9/1969 | Bassett |
| 4,107,870 A | 8/1978 | Ausnit |
| 4,205,152 A | 5/1980 | Mizuguchi et al. |
| 4,290,170 A | 9/1981 | Brookstein et al. |
| 4,575,330 A | 3/1986 | Hull |
| 4,674,580 A | 6/1987 | Schuh |
| 4,735,418 A | 4/1988 | Engel |
| 4,777,859 A * | 10/1988 | Plummer, Jr. ...... B29C 61/0658 87/7 |
| 4,978,564 A * | 12/1990 | Douglas ................. B64G 1/222 428/542.8 |
| 5,281,181 A | 1/1994 | McCollum |
| 5,853,313 A | 12/1998 | Zheng |
| 5,928,803 A * | 7/1999 | Yasuda .................. A63H 33/22 374/101 |
| 6,012,494 A | 1/2000 | Balazs |
| 6,264,199 B1 | 7/2001 | Schaedel |
| 6,569,373 B2 | 5/2003 | Napadensky |
| 7,007,370 B2 | 3/2006 | Gracias et al. |
| 7,160,612 B2 | 1/2007 | Magill et al. |
| 7,216,678 B2 * | 5/2007 | Baer ...................... D03D 3/08 139/383 R |
| 7,225,045 B2 | 5/2007 | Gothait et al. |
| 7,300,619 B2 | 11/2007 | Napadensky et al. |
| 7,500,846 B2 | 3/2009 | Eshed et al. |
| 7,575,807 B1 | 8/2009 | Barvosa-Carter et al. |
| 7,851,122 B2 | 12/2010 | Napadensky |
| 7,862,624 B2 * | 1/2011 | Tran ...................... D06M 16/00 340/540 |
| 8,082,696 B2 * | 12/2011 | Oliver ...................... B32B 3/04 267/142 |
| 8,424,249 B2 * | 4/2013 | Oliver ...................... B32B 3/04 428/71 |
| 8,475,074 B1 | 7/2013 | Henry |
| 8,652,602 B1 | 2/2014 | Dolla |
| 8,992,183 B2 | 3/2015 | Perich et al. |
| 9,079,337 B2 | 7/2015 | Lipton et al. |
| D744,719 S | 12/2015 | Amarasiriwardena |
| 9,487,387 B2 | 11/2016 | MacCurdy et al. |
| 9,723,866 B2 | 8/2017 | Lipson et al. |
| 9,987,907 B1 * | 6/2018 | Temchenko ............. C09J 7/255 |
| 9,993,104 B2 | 6/2018 | Lipton et al. |
| 10,005,235 B2 | 6/2018 | Millar |
| 10,118,339 B2 | 11/2018 | Lipton et al. |
| 10,132,931 B2 | 11/2018 | MacCurdy et al. |
| 10,166,726 B2 | 1/2019 | Fripp et al. |
| 10,259,161 B2 | 4/2019 | Lipton et al. |
| 10,513,089 B2 | 12/2019 | Tibbits et al. |
| 10,549,505 B2 | 2/2020 | Tibbits et al. |
| 2002/0043950 A1 | 4/2002 | Yim et al. |
| 2002/0104973 A1 | 8/2002 | Kerekes |
| 2002/0116847 A1 | 8/2002 | Yen |
| 2002/0125790 A1 | 9/2002 | Horning et al. |
| 2003/0090034 A1 | 5/2003 | Mulhaupt et al. |
| 2003/0177749 A1 * | 9/2003 | Jen ........................ D02G 3/32 57/289 |
| 2004/0197519 A1 * | 10/2004 | Elzey ...................... B32B 3/28 428/68 |
| 2004/0244309 A1 | 12/2004 | Raue |
| 2005/0227560 A1 | 10/2005 | Allred, III |
| 2006/0016507 A1 * | 1/2006 | Baer ...................... D03D 3/08 139/383 R |
| 2006/0184231 A1 * | 8/2006 | Rucker ................... A61F 2/88 623/1.15 |
| 2006/0186700 A1 | 8/2006 | Browne et al. |
| 2007/0036964 A1 | 2/2007 | Rosenberger et al. |
| 2007/0106173 A1 * | 5/2007 | Korotko ................. A61B 5/01 600/549 |
| 2007/0134486 A1 * | 6/2007 | Bansal ................ A41D 19/015 428/304.4 |
| 2007/0163305 A1 * | 7/2007 | Baer ...................... D04B 21/16 66/171 |
| 2008/0027199 A1 | 1/2008 | Mazurek et al. |
| 2008/0057809 A1 | 3/2008 | Rock |
| 2008/0066393 A1 | 3/2008 | Sorensen |
| 2008/0075850 A1 | 3/2008 | Rock |
| 2008/0075930 A1 | 3/2008 | Kornbluh et al. |
| 2008/0105324 A1 * | 5/2008 | Baer ...................... D03D 3/08 139/386 |
| 2008/0109103 A1 | 5/2008 | Gershenfeld et al. |
| 2008/0234458 A1 * | 9/2008 | West ...................... C08G 18/36 528/85 |
| 2008/0269420 A1 | 10/2008 | Tong et al. |
| 2008/0282527 A1 | 11/2008 | Beck et al. |
| 2009/0176054 A1 | 7/2009 | Laib et al. |
| 2009/0218307 A1 | 9/2009 | Davies et al. |
| 2009/0233067 A1 | 9/2009 | Doornheim et al. |
| 2010/0168439 A1 | 7/2010 | Olson |
| 2010/0191360 A1 | 7/2010 | Napadensky et al. |
| 2010/0199582 A1 * | 8/2010 | Oliver ...................... B32B 3/04 52/309.1 |
| 2011/0285052 A1 | 11/2011 | Wigand et al. |
| 2012/0037263 A1 * | 2/2012 | Malloy .................... D03D 3/00 139/387 R |
| 2012/0068378 A1 | 3/2012 | Swanson et al. |
| 2012/0091744 A1 | 4/2012 | McKnight et al. |
| 2012/0094060 A1 | 4/2012 | Gershenfeld et al. |
| 2012/0133080 A1 | 5/2012 | Moussa et al. |
| 2012/0137611 A1 * | 6/2012 | Oliver ...................... B32B 3/04 52/309.1 |
| 2012/0308805 A1 | 12/2012 | Sella |
| 2013/0040091 A1 | 2/2013 | Dikovsky et al. |
| 2013/0073068 A1 | 3/2013 | Napadensky |
| 2013/0078415 A1 * | 3/2013 | Rock ...................... D04B 1/00 428/96 |
| 2013/0089642 A1 | 4/2013 | Lipson et al. |
| 2013/0243997 A1 | 9/2013 | Spadaccini et al. |
| 2013/0246018 A1 | 9/2013 | Spadaccini et al. |
| 2013/0249981 A1 | 9/2013 | Nakagawa |
| 2014/0013962 A1 | 1/2014 | Lipton et al. |
| 2014/0037873 A1 | 2/2014 | Cheung et al. |
| 2014/0050811 A1 | 2/2014 | Lipton et al. |
| 2014/0059734 A1 | 3/2014 | Toronjo |
| 2014/0101816 A1 | 4/2014 | Toronjo |
| 2014/0311187 A1 | 10/2014 | Amarasiriwardena et al. |
| 2015/0014881 A1 | 1/2015 | Elsey |
| 2015/0017411 A1 | 1/2015 | Wilkie et al. |
| 2015/0075033 A1 | 3/2015 | Cross et al. |
| 2015/0158244 A1 | 6/2015 | Tibbits et al. |
| 2015/0174885 A1 | 6/2015 | Khan |
| 2016/0023403 A1 | 1/2016 | Ramos |
| 2016/0067918 A1 | 3/2016 | Millar |

(56) References Cited

U.S. PATENT DOCUMENTS

| | | | |
|---|---|---|---|
| 2016/0101594 | A1 | 4/2016 | Tibbits et al. |
| 2016/0121546 | A1 | 5/2016 | Yao et al. |
| 2016/0208476 | A1 | 7/2016 | Wadley et al. |
| 2016/0214321 | A1 | 7/2016 | Tow et al. |
| 2016/0317939 | A1 | 11/2016 | Fernandez et al. |
| 2016/0318255 | A1 | 11/2016 | Ou et al. |
| 2016/0340814 | A1 | 11/2016 | Ridley et al. |
| 2016/0340826 | A1 | 11/2016 | Tibbits et al. |
| 2017/0042034 | A1 | 2/2017 | MacCurdy et al. |
| 2017/0057704 | A1 | 3/2017 | Li et al. |
| 2017/0106594 | A1 | 4/2017 | Gardiner |
| 2017/0120535 | A1 | 5/2017 | MacCurdy et al. |
| 2017/0145694 | A1 | 5/2017 | Carney et al. |
| 2017/0182723 | A1 | 6/2017 | Calisch et al. |
| 2017/0326785 | A1 | 11/2017 | MacCurdy et al. |
| 2018/0156204 | A1 | 6/2018 | Lipton |
| 2018/0187337 | A1* | 7/2018 | Iseki ................. D01F 6/70 |
| 2018/0194106 | A1 | 7/2018 | Tibbits et al. |
| 2018/0281295 | A1 | 10/2018 | Tibbits et al. |
| 2018/0291535 | A1 | 10/2018 | Ridley et al. |
| 2018/0311833 | A1 | 11/2018 | Lipton et al. |
| 2019/0084282 | A1* | 3/2019 | Prasad ................. B32B 7/02 |

FOREIGN PATENT DOCUMENTS

| | | | |
|---|---|---|---|
| DE | 20 2009 000 527 U1 | 4/2009 | |
| EP | 1274559 B1 | 1/2003 | |
| FR | 1331581 A | 7/1963 | |
| FR | 1243060 A | 10/1967 | |
| FR | 2479923 | 4/1980 | |
| FR | 2583334 A1 | 12/1986 | |
| FR | 2956590 | 8/2011 | |
| GB | 2455167 A | 6/2009 | |
| JP | H07 42024 A | 2/1995 | |
| WO | WO 00/69747 A1 | 11/2000 | |
| WO | 01/78968 A1 | 10/2001 | |
| WO | 2014014892 A2 | 1/2014 | |
| WO | WO 2014/025089 A1 | 2/2014 | |
| WO | WO 2015/084422 A1 | 6/2015 | |
| WO | WO 2015/139095 A1 | 9/2015 | |
| WO | WO 2016/057853 A1 | 4/2016 | |
| WO | WO 2017/079475 A1 | 5/2017 | |
| WO | 2017081040 A1 | 5/2018 | |
| WO | WO 2018/088965 A1 | 5/2018 | |
| WO | 2018/187514 A1 | 10/2018 | |

OTHER PUBLICATIONS

A Brief History of 3D Printing, T. Rowe Price, 1 page (2012).
About Additive Manufacturing, Additive Manufacturing Research Group, Loughborough University, copyright 1016, http://www.lboro.ac.uk!research/amrg/about/the7categoriesofadditivemanufacturing/.
Aguilera, E., et al., "3D Printing of Electro Mechanical Systems," *24th International SFF Symposium—An Additive Manufacturing Conference, SFF 2013*, pp. 950-961 (2013).
Ahn, J-H., et al., "Heterogeneous Three-Dimensional Electronics by Use of Printed Semiconductor Nanomaterial," *Science*, 314: 1754-1757 (2006).
Akhavan, V., et al., "Reacting Thick-Film Copper Conductive Inks with Photonic Curing," 5 pages (2013).
Altan, T., et al., "Manufacturing of Dies and Molds," 19 pages (2001).
Armon, Shahaf et al., "Geometry and Mechanics in the Opening of Chiral Seed Pods," *Science*, 333: 1726-1730 (2011).
Bailey, S.A., et al., "Biomimetic Robotic Mechanisms via Shape Deposition Manufacturing," pp. 1-8 (2000).
Bartlett, Nicholas W., et al, "A 3D-printed, functionally graded soft robot powered by combustion," *Science*, 349(6244): 161-166 (Jul. 10, 2015).
Bendsøe, M.P. and Kikuchi, N., "Generating Optimal Topologies in Structural Desing Using a Homogenization Method," *Comp. Meth. App. Mech. Eng.*, 71: 197-224 (1988).
Berman, B., "3-D Printing: The New Industrial Revolution," *Business Horizons*, 55: 155-162 (2012).
Bhargava, K. et al, "Discrete Elements for 3D Microfluidics," *PNAS*, 111(42): 15013-15018 (2014).
Bicchi, A. and Tonietti, G., "Fast and 'Soft-Arm' Tactics," *IEEE Robotics & Automation Magazine*, 22-33 (2004).
Blakely, Andrew M., "Bio-Pick, Place, and Perfuse: A New Instrument for 3D Tissue Engineering," *Tissue Engineering: Part C*, vol. 00, No. 00, pp. 1-10 (2015).
Borghino, D., "Voxel8 Paves the Way for 3D-Printed Electronics," Accessed at www.gizmag.com pp. 1-6 (Jan. 14, 2015).
Bruyas, A., et al., "Combining Multi-Material Rapid Prototyping and Pseudo-Rigid Body Modeling for a New Compliant Mechanism," *2014 IEEE International Conference on Robotics & Automation (ICRA)*, pp. 3390-3396 (2014).
Cali, J., et al., "3D-Printing of Non-Assembly, Articulated Models," *ACM Trans. Graph.*, Article No. 130, 31(6): 1-8 (2012).
Cantatore, E., "Applications of Organic and Printed Electronics, A Technology-Enabled Revolution," Springer Publishers, ISBN No. 978-1-4614-3159-6, pp. 1-187 (2013).
Chandler, David L. Printing off the Paper. MIT News (2011); available at: http://web.mit.edu/newsoffice/2011/3d-printing-0914.html, 4 pages, (last visited: Mar. 3, 2014).
Cheney, N., et al., "Unshackling Evolution," *SIGEVOlution*, 7(1): 11-23 (2013).
Christenson, K.K., et al., "Direct Printing of Circuit Boards Using Aerosol Jet®," *Tech. Prog. Proc.*, pp. 433-436 (2011).
Church, K., et al., "Commercial Applications and Review for Direct Write Technologies," *Mat. Res. Soc. Symp. Proc.*, 624: 3-8 (2000).
Comber, D.B., et al., "Design, Additive Manufacture, and Control of a Pneumatic MR-Compatible Needle Driver," *IEEE Trans. Rob.*, 1-12 (2015).
Coros, S., et al., "Computational Design of Mechanical Characters," 12 pages (2013).
De Laurentis, K.J., et al., "Procedure for Rapid Fabrication of Non-Assembly Mechanisms with Embedded Components," *Proceedsing of DETC'02: ASME 2002 Design Engineering Technical Conferences and Computers and Information in Engineering Conference*, pp. 1-7 (2002).
Derby, B., "Inkjet Printing of Functional and Structural Materials: Fluid Property Requirements, Feature Stability, and Resolution," *Annu. Rev. Mater. Res.*, 40: 395-414 (2010).
Dimas, L.S., et al., "Tough Composites Inspired by Mineralized Natural Materials: Computation, 3D Printing, and Testing," *Adv. Funct. Mater.*, 23(36): 1-10 (2013).
Doubrovski, E.L., et al., "Voxel-Based Fabrication Through Material Property Mapping: A Design Method for Bitmap Printing," *Computer-Aided Design*, 60: 3-13 (2015).
Dutta, D., et al., "Layered Manufacturing: Current Status and Future Trends," *Trans. ASME*, 1:60-71 (Mar. 2001).
Eaton, M., et al., "The Modelling, Prediction, and Experimental Evaluation of Gear Pump Meshing Pressures with Particular Reference to Aero-Engine Fuel Pumps," *Proc. IMechE*, 220 (Part 1): 365-379 (2006).
Espalin, D., et al., "3D Printing Multifunctionality: Structures with Elements," *Int. J. Adv. Manuf. Technol.*, 72: 963-978 (2014).
Ferry, P.W., et al., "A Review on Stereolithography and Its Applications in Biomedical Engineering," *Biomat.*, 31: 6121-6130 (2010).
Fuller, S.B., et al., "Ink-Jet Printed Nanoparticle Microelectromechanical Systems," *J. Microelec. Sys.*, 11(1): 54-60 (2002).
Ge, Qi, et al., "Active materials by four-dimension printing," *Applied Physics Letters*, 103: 131901-131901-5 (2013).
Gong, H., et al., "High Density 3D Printed Microfluidic Valves, Pumps, and Multiplexers, Lab on a Chip" *Royal Society of Chemistry*, 9 pages (2016).
Grunewald, S., "Nano Dimension Unveils the DragonFly 2020, World's First Desktop Electronic 3D Printer," Downloaded from https://3DPrint.com, *The Voice of 3D Printing Technologies*, pp. 1-5 (Nov. 18, 2015).
Grzesiak, A., et al., "The Bionic Handling Assistant: A Success Story of Additive Manufacturing," Assemb. Autom., 31(4): 329-333 (2011).

(56) References Cited

OTHER PUBLICATIONS

Guan, J. et al. "Self-Folding of Three-Dimensional Hydrogel Microstructures," *Journal of Physical Chemistry B*, 109:23134-23137 (2005).

Hawkes et al. Programmable matter by folding, *PNAS*, vol. 107(28): 12441-12445 (2010).

Hiller, J. and Lipson, H., "Automatic Design and Manufacture of Soft Robots," IEEE Trans. Rob., 28(2): 457-466 (2012).

Hiller, J. and Lipson, H., "Methods of Parallel Voxel Manipulation for 3D Digital Printing," pp. 200-211 (2007).

Hiller, J. and Lipson, H., "Tunable Digital Material Properties for 3D Voxel Printers," *Rapid Prototyping Journal*, 16(4): 241-247 (2009).

Hiller, J.D., et al., "Microbricks for Three-Dimensional Reconfigurable Modular Microsystems," *J. Microelec. Sys.*, 20(5): 1089-1097 (2011).

Huber, C., et al., 3D Print of Polymer Bonded Rare-Earth Magnets, and 3D Magnetic Field Scanning with an End-User 3D Printer, *Applied Physics Letters*, 109: 162401-1-162401-4 (2016).

Ionov, L., "Soft Microorigami: self-folding polymer films," *Soft Matter*, 7: 6786 (Published online May 24, 2011).

Jeffrey, C., "V-One Conductive Ink Printer Aims to Short-Circuit Electronic Prototyping," accessed on www.gizmag.com pp. 1-6 (Feb. 10, 2015).

Jeong, K-U. et al., "Three-dimensional actuators transformed from the programmed two-dimensional structures via bending, twisting and folding mechanisms," *Journal of Materials Chemistry*, 21: 6824-6830 (2011).

Jung et al., "Water-responsive shape memory polyurethane block copolymer modified with polyhedral oligomeric silsesquioxane," *Journal of Macromolecular Science*, Part B, 45: 453-461 (2006).

Kang, H., et al., "Direct Intense Pulsed Light Sintering of Inkjet-Printed Copper Oxide Layers within Six Milliseconds," *ACS Appl. Mater. Interfaces*, 6:1682-1687 (2014).

Kanthal Thermostatic Bimetal Handbook, Kanthal AB, pp. 1-134 (2008).

Klein, Yael, et al. "Shaping of Elastic Sheets by Prescription of Non-Euclidean Metrics," *Science*, 315:1116-1120 (2007).

Kolesky, D.B., et al., "3D Bioprinting of Vascularized, Heterogeneous Cell-Laden Tissue Constructs," *Adv. Mater.*, 26:3124-3130 (2014).

Kong, Y.L., et al., "3D Printed Quantum Dot Light-Emitting Diodes," *Nano. Lett.*, 14:7017-7023 (2014).

Kruth, J.P., et al., "Progress in Additive Manufacturing and Rapid Prototyping," *Annals CIRP*, 47(2): 525-540 (1998).

Kuehn, T. and Rieffel, J., "Automatically Designing and Printing 3-D Objects with EvoFab 0.2," *Artificial Life*, 13: 372-378 (2012).

Laschi, C., et al., "Soft Robot Arm Inspired by the Octopus," *Adv. Rob.*, 26: 709-727 (2012).

Li, B., et al., "Robust Direct-Write Dispensing Tool and Solutions for Micro/Meso-Scale Manufacturing and Packaging," *ASME Proceedings of the 2007 International Maufacturing Science and Engineering Conference*, pp. 1-7 (2007).

Li, X., "Embedded Sensors in Layered Manufacturing," *Dissertation submitted to Stanford University*, pp. 1-152 (Jun. 2001).

Lin, H.-T., et al., "GoQBot: A Caterpillar-Inspired Soft-Bodied Rolling Robot," Bioinsp. Biomim., 6: 1-14 (2011).

Lipson, H., "Challenges and Opportunities for Design, Simulation, and Fabrication of Soft Robots," Soft Robotics, 1(1): 21-27 (2014).

Lipson, H., and Kurman, M., "Factory@Home—The Emerging Economy of Personal Manufacturing," One of a series of Occasional Papers in Science and Technology Policy, pp. 1-103 (Dec. 2010).

Lipton, J. et al., "Fab@Home Model 3: A More Robust, Cost Effective and Accessible Open Hardware Fabrication Platform," 125-135 (2012).

Liu, Y., et al., "Self-Folding by Local Light Absorption," screenshots provided, full video available at: http://www.youtube.com/watch?v=NKRWZG67dtQ, pp. 1-10, (Nov. 10, 2011).

Liu, Y., et al., "Self-folding of polymer sheets using local light absorption," Soft Matter 8(6): 1764-1769 (2012).

Louis-Rosenberg, J., "Drowning in Triangle Soup: The Quest for a Better 3-D Printing File Format," *XRDS*, 22(3): 58-62 (2016).

MacCurdy, R., et al., "Bitblox: Printable Digital Materials for Electromechanical Machines," Int'l J. Robotics Res., 33(10), 1342-1360 (2014).

MacCurdy, R., et al., "Printable Hydraulics: A Method for Fabricating Robots by 3D Co-Printing Solids and Liquids," *2016 IEEE International Conference on Robotics and Automation (ICRA)*, pp. 1-8 (2016).

MacCurdy, R., et al., "Printable Programmable Viscoelastic Materials for Robots," *IEEE/RSJ International Conference on Intelligent Robots and Systems (IROS)*, pp. 1-8 (2016).

MacDonald, E., et al., "3D Printing for the Rapid Prototyping of Structural Electronics," *IEEE*, 2:234-242 (2014).

Macdonald, N.P., et al., "Assessment of Biocompatibility of 3D Printed Photopolymers Using Zebrafish Embryo Toxicity Assays," *Royal Society of Chemistry—Lab on a Chip*, 16: 291-297 (2016).

Mack, E., "Beyond 3D Printers and the Coming of the Home Electronics Factory," www.gizmag.com, pp. 1-5 (Oct. 22, 2014).

Malone, E., and Lipson, H., "Multi-Material Freeform Fabrication of Active Systems," *Proceedings of the 9th Biennial ASME Conference on Engineering Systems Design and Analysis*, pp. 1-9, (2008).

Mannoor, M.S., et al., "3D Printed Bionic Ears," *Nano. Lett.*, 13: 2634-2639 (2013).

Mao, Y., et al., "Scientific Reports: Sequential Self-Folding Structures by 3D Printed Digital Shape Memory Polymers," *Nature*, pp. 1-12 (2015).

Marchese, a.D., et al.,"A Recipe for Soft Fluidic Elastomer Robots," *Soft Robotics*, 2(1): 7-25 (2015).

Mehta, A., et al., "Cogeneration of Mechanical, Electrical, and Software Design for Printable Robots from Structural Specifications," *Int. Rob. Sys.*: 2892-2897 (2014).

Mehta, A., et al., "Integrated Codesign of Printable Robots," *J. Mech. Rob.*, 7: 1-10 (2015).

Meisel, N.A., et al., "A Procedure for Creating Actuated Joints via Embedding Shape Memory Alloys in Polyjet 3D Printing," *J. Intel. Mat. Sys. Struct.*, pp. 1-15 (2014).

Melchels, F. P.W., et al., "A review on stereolithography and its applications in biomedical engineering," *Biomaterials*, 31:6121-6130 (2010).

Merz, R, "Shape Deposition Manufacturing," *Proceedings of the Solid Freeform Fabrication Symposium*, The University of Texas at Austin, pp. 1-7 (1994).

Merz, R, et al., Dissertation entitled "Shape Deposition Manufacturing," pp. 1-190 (1994).

Mironov, V., et al., "Organ Printing: Computer-Aided Jet-Based 3D Tissue Engineering," *Trends Biotech.*, 21(4):157-161 (2003).

Morin, S.A., et al., "Using Click-e-Bricks to Make 3D Elastomeric Structures," *Adv. Mater.*, 26: 5991-5999 (2014).

Mueller, S., et al., "faBrickation: Fast 3D Printing of Functional Objects by Integrating Construction Kit Building Blocks," *Session: 3D Printing and Fabrication*, 3827-3834 (2014).

Mueller, S., et al., "Mechanical Properties of Parts Fabricated with Inkjet 3D Printing Through Efficient Experimental Design," *Materials and Design*, 86:902-912 (2015).

Murphy, S.V. and Atala, A., "3D Bioprinting of Tissues and Organs," *Nat. Biotech.*, 32(8):773-785 (2014).

Murray, C., "Smart Actuator Propels Hydraulic 'Beast of Burden'", Design News [online], Jun. 4, 2015 [retrieved Oct. 21, 2016]. Retrieved from the Internet URL: http://www.designnews.com/document.asp?doc_id=277754.

"Muscle Fiber Organization" acquired from https://oli.cmu.edu/jcourse/workbook/activity/page?context=df3c7ca90a0001dc2a2c9e4d7976ae35 on Mar. 18, 2018.

O'Donnell, J., et al., "A Review on Electromechanical Devices Fabricated by Additive Manufacturing," *J. of Manufacturing Science and Engineering*, pp. 1-45 (2015).

Palmer, J.A., et al., "Realizing 3-D Interconnected Direct Write Electronics within Smart Stereolithography Structures," *Proceedings of IMECE2005—2005 ASME International Mechanical Engineering Congress and Exposition*, pp. 1-7 (2005).

Park, S., et al., "Self-Assembly of Mesoscopic Metal-Polymer Amphiphiles," *Science*, 303: 348-351 (2004).

(56) References Cited

OTHER PUBLICATIONS

Peele, B.N., et al., "3D Printing Antagonistic Systems of Artificial Muscle Using Projection Stereolithography," *Bioinspir. Biomim.*, 10:1-8 (2015).
Popescu, G. A., et al., "Digital Materials for Digital Printing," *Soc. Imaging Sci. Tech.*, pp. 58-61 (2006).
Popescu, G.A., "Digital Materials for Digital Fabrication," Thesis submitted to Massachusetts Institute of Technology, pp. 1-53 (Aug. 20, 2007).
Proto3000: "3D Printed Snow Globe by Proto3000—Thingiverse," Retrieved from the internet: http://www.thingiverse.com/thing:225572, Retrieved on: Jan. 10, 2017.
Rost, A., and Schädle, S., "The SLS-Generated Soft Robotic Hand—An Integrated Approach Using Additive Manufacturing and Reinforcement Learning," IEEE: 215-220 (2013).
Rus, D. and Tolley, M.T., "Design, Fabrication and Control of Soft Robots," *Nature*, 521: 467-475 (2015).
Russo, A., et al., "Pen-On-Paper Flexible Electronics," *Adv. Mater.*, 23: 3426-3430 (2011).
Saari, M., et al., "Fiber Encapsulation Additive Manufacturing: An Enabling Technology for 3D Printing of Electromechanical Devices and Robotic Components," *3D Printing*, 2(1):32-39 (2015).
Safari, A., et al., "Solid Freeform Fabrication of Piezoelectric Sensors and Actuators," *J. Mat. Sci.*, 41: 177-198 (2006).
Saleh, E., et al., "3D Inkjet-Printed UV-Curable Inks for Multi-Functional Electromagnetic Applications," *Proceedings of ISFA2014*, pp. 1-5 (2014).
Sangani, K., "How to . . . Print Gadgets," *Engineering & Technology*, pp. 58-60 (2013).
Sharmis Passions, "Eggless Chocolate Cake—Moist Chocolate Cake Recipe (No eggs No butter)," http://www.sharmispassions.com/201 0/03/simple-moistchocolate-cakewith-no-eggs. html, pp. 1-37 (posted Mar. 27, 2010).
Sharon, E. et al., "The Mechanics of Non-Euclidean Plates," *Soft Matter*, 6: 5693-5704 (2010).
Sharon, Eran et al., "Leaves, Flowers and Garbage Bags: Making Waves," *American Scientist*, 92: 254-261 (2004).
Sharon, Eran., "Swell Approaches for Changing Polymer Shapes," *Science*, 335: 1179-1180 (2012).
Sitthi-Amorn, P., et al., "MultiFab: A Machine Vision Assisted Platform for Multi-Material 3D Printing," *ACM Transactions on Graphics*, Article No. 129, 34(4): 1-11 (2015).
"Skeletal Muscle Organ Anatomy" acquired from https://oli.cmu.edu/jcourse/workbook/activity/page?context=b880ee6b80020ca601351c786c5dfea8 on Mar. 18, 2018.
Slightam, J.E. and Gervasi, V.R., "Novel Integrated Fluid-Power Actuators for Functional End-Use Components and Systems via Selective Laser Sintering Nylon 12," *23rd Ann Int Solid Freeform Fabrication Symp*: pp. 197-211 (2012).
Slotwinski, J.A., "Materials Standards for Additive Manufacturing," *National Institute of Standards and Technology (NIST), PDES, Inc. Workshop* (Mar. 14, 2013).
Snyder, T.J., et al., "3D Systems' Technology Overview and New Applications in Manufacturing, Engineering, Science, and Education," Mary Ann Liebert, Inc., 1(3):169-176 (2014).
Takatsu, H., et al., "Stress Analysis Method of U-Shaped Bellows and Its Experimental Verification," *Fusion Eng. & Des.*, 22: 239-250 (1993).
Tanaka, M., "Fatigue Life Estimation of Bellows Based on Elastic-Plastic Calculations," *Int. J. Pres. Ves. & Piping*, 2: 51-68 (1974).
Thomaszewski, B., et al.," Computational Design of Linkage-Based Characters," 9 pages (2014).
Thryft, Ann R., "3D Printing Now Good Enough for Final & Spare Car Parts," downloaded from www.designnews.com, 3 pages, (Jul. 22, 2016).
Tibbets, S. and Cheung, K., "Programmable Materials for Architectural Assembly and Automation," *Assembly Automation*, 32(3): 216-225 (2012).
Tibbits, S., "4D Printing: Self-Assembling Parts in Action at TED2013," by Stratasys Staff (Apr. 29, 2013).
Tibbits, Skylar J.E,. "4D Printing: Multi-Material Shape Change," *Architectural Design Journal* 84: 116-121 (2014).
Tibbits, Skylar., "Design to Self Assembly," *Architectural Design Journal*, 82(2): 68-73 (2012).
Tibbits, Skylar., "The Emergence of 4D Printing," TED Talk filed in Feb. 2012; transcript provided, 6 pages, video available at http://www.ted.com/talks/skylar_tibbits_the_emergence_of_4d_printing.html.
Tolley, M.T., et al., "A Resilient, Untethered Soft Robot," *Soft Robotics*, 1(3): 213-223 (2014).
Torrisi, F., et al., "Inkjet-Printed Graphene Electronics," *Am. Chem. Soc.*, 6(4): 2992-3006 (2012).
Tumbleston, J.R., et al., "Continuous Liquid Interface Production of 3D Objects," *Research Reports*, 347(6228): 1349-1353 (2015).
TUNISIANSWIFE, Easy Chocolate Bundt Cake Glaze (allrecipies.com accessed Jun. 6, 2016) http:/ /all recipes. com/recipe/1 00335/easy -choco late-bu ndt -cake-glaze/.
Ultem®/PEI (Polyetherimide): Aetna Plastics, Accessed: Jun. 1, 2016.
Waheed, S., "3D Printed Microfluidic Devices: Enablers and Barriers," *Royal Society of Chemistry, Lab on a chip*, 16: 1993-2013 (2016).
Walker, S.B. and Lewis, J.A., "Reactive Silver Inks for Patterning High-Conductivity Features at Mild Temperatures," *Am. Chem. Soc.*, 134: 1419-1421 (2012).
Wang, L., et al., "Robotic Folding of 2D and 3D Structures from a Ribbon," *IEEE International Conference on Robotics and Automation (ICRA)*, pp. 3655-3660 (2016).
Weiss, L., et al., "Shape Deposition Manufacturing of Wearable Computers," pp. 31-38 (1996).
Weiss, L.E., et al., "Shape Deposition Manufacturing of Heterogeneous Structures," *J. Manu. Sys.*, 16(4): 239-248 (1997).
Westbrook, K.K., et al., "A 3D finite deformation constitutive model for amorphous shape memory polymers: A multi-branch modeling approach for nonequilibrium relaxation processes," *Mechanics of Materials* 43: 853-869 (2011).
Whitney, J. P., et al., "A Low-Friction Passive Fluid Transmission and Fluid-Tendon Soft Actuator," 8 pages (2014).
Willis, K.D.D., et al., "Printed Optics: 3D Printing of Embedded Optical Elements for Interactive Devices," *UIST'12*, pp. 589-598 (Oct. 2012).
Wu, S-Y., et al., "3D-Printed Microelectronics for Integrated Circuitry and Passive Wireless Sensors," *Microsystems & Nanoengineering*, 1:1-9 (2015).
Xia, Fan and Jiang, Lei., "Bio-Inspired, Smart, Multiscale Interfacial Materials," *Advanced Materials* (20): 2842-2858 (2008).
Xie, T., "Tunable polymer multi-shape memory effect," *Nature Letters*, 464: 267-270 (2010).
Xu, S., et al., "Soft Microfluidic Assemblies of Sensors, Circuits, and Radios for the Skin," *Science*, 344: 70-74 (2014).
Yap, H.K., et al., "High-Force Soft Printable Pneumatics for Soft Robotic Applications," *Soft Robotics*, 3(3): 144-158 (2016).
Younsheng, L. and Shuiping, S., "Strength Analysis and Structural Optimization of U-Shaped Bellows," *Int. J. Pres. Ves. & Piping*, 42: 33-46 (1990).
Touloukian, Y.S. et al., Thermophysical Properties of Matter, vols. 12, Thermal Expansion Metallic Elements and Alloys (1975) (selected pages).
Touloukian, Y. S. et al., Thermophysical Properties of Matter, vol. 13, Thermal Expansion Nonmetallic Solids (1977) (selected pages).
Janbaz, et al., Programming the shape-shifiting of flat soft matter: from self-rolling/self-twisting materials to self-folding origami, Materials Horizones, Issue 6, pp. 534-547, Aug. 2016.
Mao et al., "3D Printed Reversible Shape Changing Components with Stimuli Responsive Materials," Scientific Reports, Issue 6, Apr. 2016.
Raviv, et al., "Active Printed Materials for Complex Self-Evolving Deformations," Scentific Reports, Issue 6, Dec. 2014.
Review: The Arrow Smart Shirt—https://www.livemint.com/Leisure/RTUZItGj1nEBfTdPTYJFEN/Review-The-Arrow-Smart-Shirt.html printed Aug. 20, 2019.
Cityzen Smart Shirt—https://newatlas.comicityzen-smart-shirt-sensing-fabric-health-monitoring/30428/ printed Aug. 20, 2019.

(56) References Cited

OTHER PUBLICATIONS

Hexoskin Smart Shirt—https://www.hexoskin.com/ printed Aug. 20, 2019.
Nike HyperAdapt. Self-Lacing Shoes—https://www.nike.com/us/en_us/c/innovation/hyperadapt printed Aug. 20, 2019.
Men's Apollo Dress Shirt—White—Ministry of Supply, https://ministryofsupply.com/products/apollo-3-dress-shirt-white printed Aug. 20, 2019.
MIT Media Lab—Tangible Media Group—bioLogic—https://tangible.media.mit.edu/project/biologic/ printed Aug. 20, 2019.
Hanuska et al., Smart Clothing Market Analysis (printed Aug. 20, 2019).
Nayakanti et al. "Twist-coupled kirigami cellular metamaterials and mechanisms," arXiv:1707.03673v1 [physics.app-oh] (2017).
Konaković et al. "Beyond developable: computational design and fabrication with auxetic materials," Proc. ACM SIGGRAPH 35, 89 (2016).
Papadopoulou et al., "Heat-active auxetic materials," in Active Matter, MIT Press (2017).
Santulli, C. & Langella, C. "Study and development of concepts of auxetic structures in bio-inspired design," Int. J. Sustainable Design, 3:1 (2016).
Ackerman, E "This self-poofing fabric transforms from t-shirt to parka," IEEE Spectrum, Mar. 18, 2017.
Advanced Functional Fabrics of America (AFFOA) Project Call 1.0 Full Proposal, Jun. 2017.
Papadopoulou et al., "Auxetic materials in design and architecture," Nature Reviews—Materials, 2:17078, Dec. 5, 2017.
Tabuchi, H. "Products and competition stretch market for 'athleisure' clothing," The New York Times, Mar. 25, 2016.
Meier et al., "An objective 3D large deformation finite element formulation for geometrically exact curved Kirchhoff rods," Computer Methods in Applied Mechanics and Engineering, Aug. 2014.
Auxetic 3D honeycomb, Retrieved from the Internet at: https://youtu.be/2WkFSlwYWLA>, 1 page (2015).
Bouten, S., "Transformable Structures and their Architectural Application," Universiteit Gent, Department of Structural Engineering, 196 pages (2015).
Clark, Liat, "How hair gel enables freeform 3D printing with an undo function," Retrieved from the Internet at: https://www.wired.co.uk/article/undo-3d-printing, Retrieved from the Internet on: Mar. 22, 2019, 11 pages.
Fairs, Marcus, Dezeen: "SCI-Arc student develops freeform 3D printing with "undo" function," Retrieved from the Internet at: https://www.dezeen.com/2013/07/23/sci-arc-student-develops-freeform-3d-printing-with-undo-function/, Retrieved from the Internet on: Oct. 8, 2019, 16 pages.
Farahi, B., "Caress of the Gaze: A Gaze Actuated 3D Printed Body Architecture," Oct. 2016, 10 pages (2016).
Gatt, R., et al., "On the behaviour of bi-material strips when subjected to changes in external hydrostatic pressure," Scripta Materialia, 60: 65-67 (2009).
Ge, Q. et al., "Active origami by 4D printing," Smart Materials and Structures, 23(9): 1-15 (2014).
Ghiuzan, "Deployable Structures," Retrieved from the Internet at: https://youtu.be/E-IqvGAfQ68>, 1 page (2016).
Hajash et al., Large-Scale Rapid Liquid Printing, *3D Printing and Additive Manufacturing*, vol. 4, No. 3 (2017).
Neville, R.M. et al., "Shape morphing Kirigami mechanical metamaterials," Scientific Reports, 6, 12 pages (2016).
Rossiter, J. et al., "Shape memory polymer hexachiral auxetic structures with tunable stiffness," Smart Materials and Structures, 23: 1-11 (2014).
"Suspended Depositions," NSTRMNT, Retrieved from the Internet at: nstrmnt.com/#/suspended-depositions/, Retrieved from the Internet on: Oct. 8, 2019, 5 pages.
Tu Delft, "4D Printing for Freeform Surfaces: Design Optimization of Origami Structures," Retrieved from the Internet at: https://youtu.be/vQB49vNFu14>, 1 page (2015).
Xu, H., "Structurally Efficient Three-dimensional Metamatcrials with Controllable Thermal Expansion," Scientific Report, 6, 8 pages (2016).
Zhang, Q. et al., "Pattern Transformation of Heat-Shrinkable Polymer by Three-Dimensional (3D) Printing Technique," Scientific Reports, 5: 1-6 (2015).
Zhang, Q. et al., "Smart three-dimensional lightweight structure triggered from a thin composite sheet via 3D printing technique," Scientific Reports, 6, 8 pages (2016).

\* cited by examiner

BEFORE

FIG. 4B

BEFORE

FIG. 4C

BEFORE

ACTIVE WOVEN MATERIALS

RELATED APPLICATIONS

This application claims the benefit of U.S. Provisional Application No. 62/445,503, filed on Jan. 12, 2017. The entire teachings of the above application is incorporated herein by reference.

BACKGROUND

Traditionally, three-dimensional structures of a material are either produced by forcing the material into place with thermo-forming, molding or other manual operations, or the three-dimensional structure is produced by the global pattern of the weave/knit/braid itself.

SUMMARY

Described herein are active fabrics and methods for creating active fabrics, such as by weaving, knitting, or braiding a combination of materials in order to provide precise and repeatable physical self-transformations by a garment or other article produced with an active fabric in response to a stimulus.

The active fabrics described are formed of a plurality of fibers or linear members woven, knit, or braided into a fabric structure. One or more of the fibers is an active material within the fabric structure that has the capability to autonomously self-transform from one shape into another shape after being subjected to a stimulus (e.g., heat, moisture, UV light or other forms of energy). This transformation can be along the length of the fiber, perpendicular to the length of the fiber, or any angle in between. The combination of multiple active fibers can cause either a local or global transformation. A local transformation potentially creates tighter or more open areas of the woven structure. A global transformation promotes a global shape change of the woven material—e.g., changing shape from flat to curled.

Described herein are active fabrics. The active fabrics includes active and passive fibers in an arrangement. At least one of the active fibers exhibits a change in dimension responsive to exposure to a stimulus, a differential between the change in dimensions producing an autonomous, predefined physical transformation as a function of the arrangement. The fibers of the active fabric can be woven, knitted, or braided. The external stimulus can be heat (e.g., a change in temperature), moisture, or light. The active fibers can be at a portion of the active fabric to produce a local physical transformation. The local physical transformation can produce a change in porosity. The active fabric can exhibit a predefined change of porosity at a location of the plurality of fibers. The active fiber can be present substantially throughout the active fabric, and the active fabric can exhibit global transformation responsive to the stimulus. The active fabric can change in three dimensions responsive to the stimulus.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 1A-B illustrate a woven material having an active fiber that transforms perpendicular to the length of the woven material. In FIG. 1B, the active fiber is indicated as a dashed line.

FIGS. 2A-B illustrate a woven material having an active fiber that transforms along the length of the woven material. In FIG. 2B, the active fiber is indicated as a dashed line.

In FIG. 3A, an active fiber winds around the cylinder. The active fiber shrinks along the length of the fiber causing the cylinder to compress in the middle. In FIG. 3B, the active fiber is woven along the cylinder and parallel to the longitudinal axis of the cylinder. When the active fiber transforms in length, the cylinder bulges causing the length to shrink. In FIG. 3C, a first active fiber winds around the cylinder (similar to FIG. 3A), and a second active fiber is woven along the cylinder and parallel to the longitudinal axis of the cylinder (similar to FIG. 3B). When the active fibers are transformed, the woven cylinder can both bulge and compress in different zones. The two active fibers in FIG. 3C can be the same or different.

In FIG. 4A, the cylinder increases in length and decreases in radius. In FIG. 4B, the cylinder decreases in length and increases in radius. In FIG. 4C, the radius of the cylinder increases at the ends of the cylinder and decreases near the middle of the cylinder.

DETAILED DESCRIPTION

A description of example embodiments follows.

Fabric Structure

As used herein, the term "active fabric" refers to fabrics formed by a variety of methods, including woven fabrics, knitted fabrics, and braided fabrics. For example, knitted fabrics can be two-dimensional or three-dimensional. In general, the fibers of the active fabric are mechanically coupled. At least one of the fibers is an active material, which exhibits a change in length or other dimension upon exposure to a stimulus (e.g., increase or decrease of an activation energy). Active fabrics can be formed having a variety of shapes, such as flat sheets or cylinders.

As described more fully below, the particular woven structure and orientation of the active fiber influences the expected transformation of the woven material.

As used herein, the term "local transformation" refers to a transformation of only a portion of an active fabric. As used herein, the term "global transformation" refers to transformation of the entirety or substantially the entirety of an active fabric.

As used herein, an "autonomous transformation" occurs without direct application of mechanical force.

As illustrated in the figures, active fabrics are made from a plurality of fibers. In the figures, the active fibers are shown with dashed lines, and passive (inactive) fibers are shown as solid lines.

The composition and characteristic of the fibers selected plays an important role in the properties of an active fabric (e.g., flexibility, strength, breathability, and waterproofing) and ultimately the physical transformation of the active fabric. Different types of fabric have characteristic directionality and/or flexibility that promotes or constrains transformation of the active material.

The orientation and properties of the active fiber within the fabric can influence global transformations and local transformations of the active fabric. The particular material from which the fiber is made influences the type of activation energy needed to cause transformation of the active fabric.

Figure 1A:
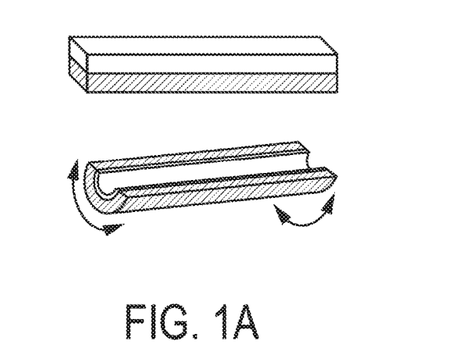
FIG. 1A is a side view of the woven material.
Figure 1B:
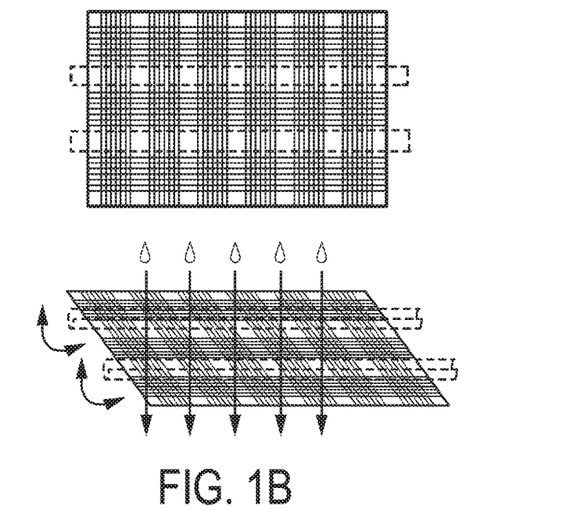
FIG. 1B is a top-down view of the woven material. Upon exposure to an external stimulus, pores of the woven material can increase is size or areas of the woven material can become looser.

When the active fabric includes one or more active fibers oriented in only one direction, then the transformation will be based on the axis of the active fiber (e.g., in line with, or perpendicular to, the axis of the fiber). If there are two active fibers arranged in two directions, there will be a combination of forces, and the resultant shape will be based on this combination of fiber orientation, axis of transformation of the fiber, and transformation force. For example, if there are two perpendicular axes of active fibers and both axes curl on themselves perpendicular to their length, then the resultant transformation will be a local transformation that either creates or eliminates porous spacing between fibers, rather than a global transformation, as illustrated in FIGS. 1A-B. Stated differently, the size of the pores can increase or decrease.

Figure 2A:
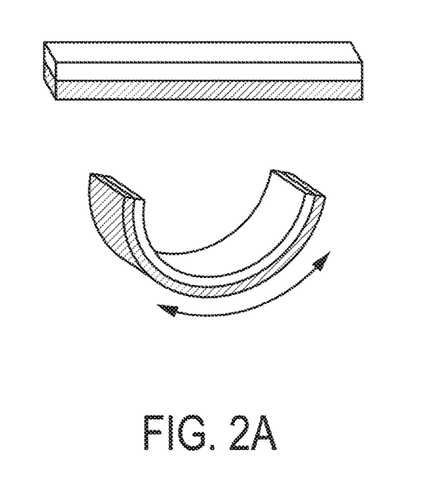
FIG. 2A is a side view of the woven material.

If the fibers are designed to transform along the length of their axis and they are woven in such a way as to have two perpendicular directions, then the resulting transformation is more complex. If an active material is laminated with a non-active material such that the active material's bias, based on its extrusion direction, is oriented toward the long-axis of the fiber, then the resultant transformation after activation is a curl along the length of the fiber, as illustrated in FIG. 2A. If an active material is laminated with a non-active material such that the active material's bias, based on its extrusion direction, is oriented toward the short-axis of the fiber, then the resultant transformation after activation is a curl along the short-axis of the fiber, as illustrated in FIG. 1A.

Figure 5:
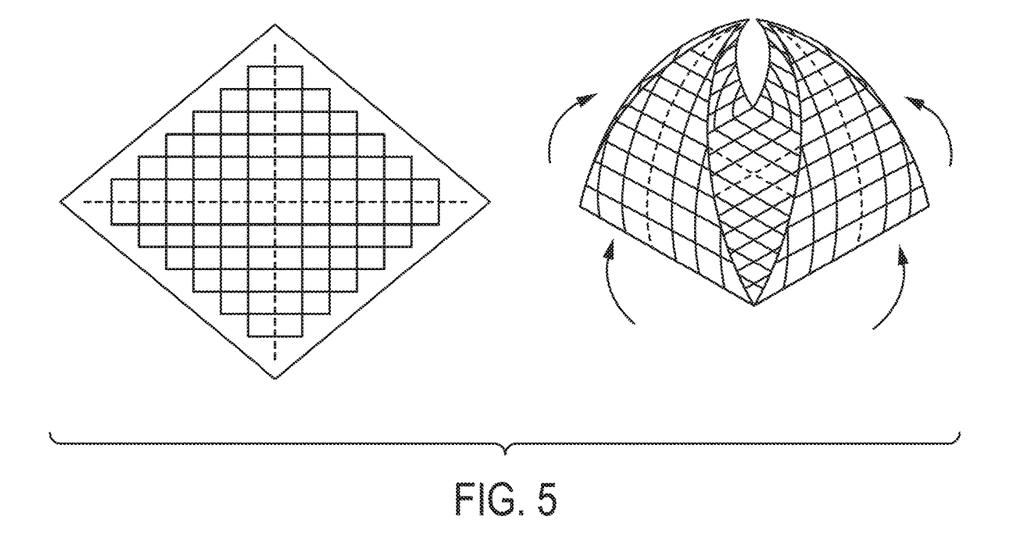
FIG. 5 is an illustration of an active fabric with active fibers from corner-to-corner.
Figure 6:
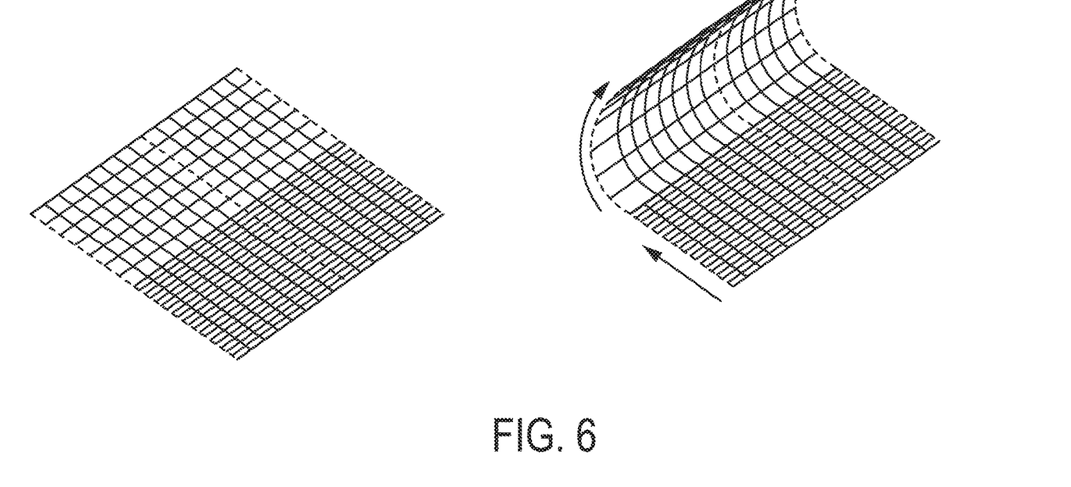
FIG. 6 is an illustration of an active fabric with two different woven densities and an active fiber running perpendicular to the two zones. When the active fibers shrink, it causes a transformation of the lower-density zone, causing it to curl upward while the higher-density zone remains flat due to the increased stiffness in that zone.
Figure 7:
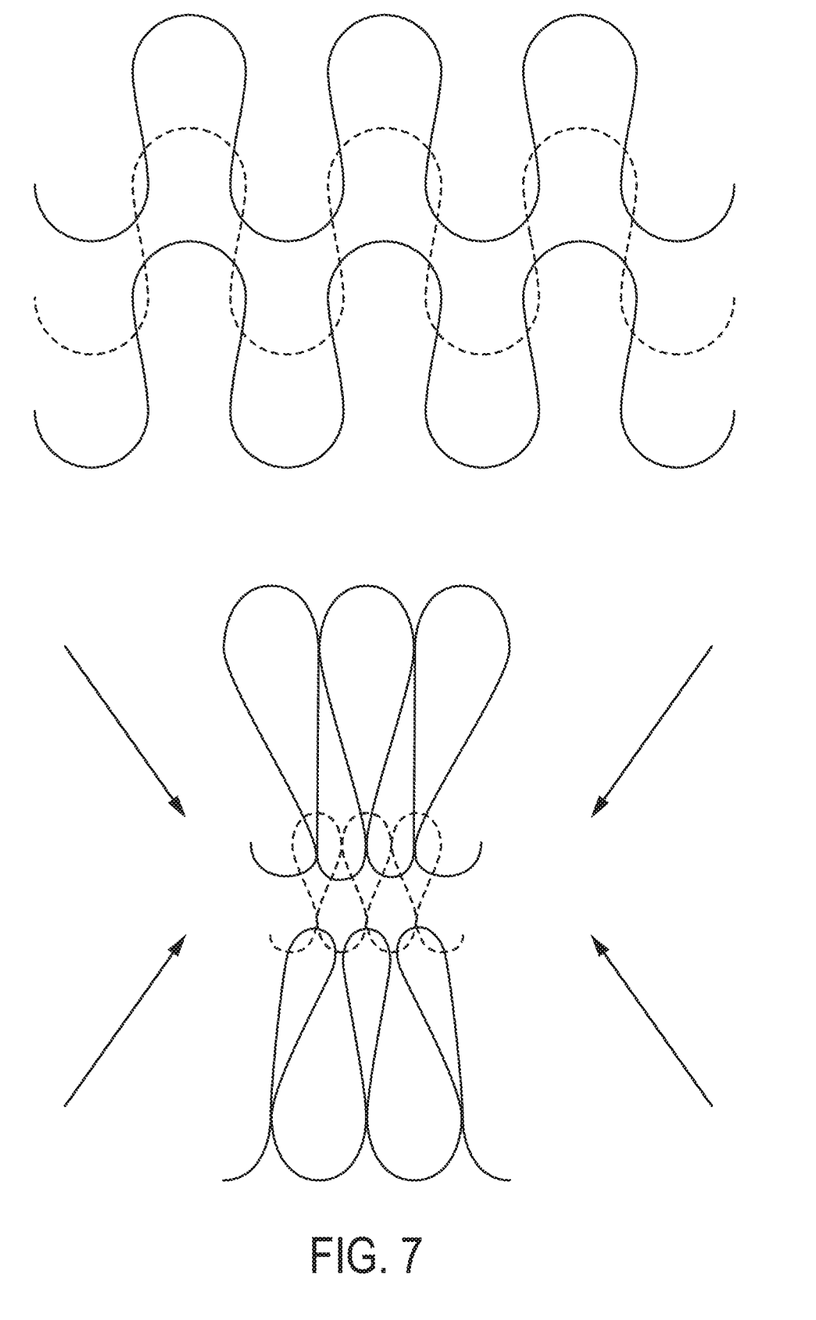
FIG. 7 is an illustration of a knitted active fabric.

One example embodiment is an active fabric that is square in shape, with woven fibers, and having two active fibers oriented toward opposing corners of the square active fabric. When the active fibers are exposed to an activation energy, then a global transformation of the shape of the active material occurs that pulls the corners inward to create a rolled-pyramid shape. An example of such a transformation is illustrated in FIG. 5.

The global structure of the weave can influence flexibility and stiffness of the fabric, or help promote certain areas of transformation, regardless of the active material. For example, if active fibers are woven such that certain areas that are fabric are more elastic than others, or certain areas have directional freedom and other areas are constrained, then the active transformation will be a result of those global woven parameters, not only based on the active fiber strength and orientation. As an example, certain zones of the fabric can be constrained by the weave (e.g., locked and can't move). As another example, certain areas of the fabric are more stiff with thicker fibers. As another example, certain areas of the fabric are more densely woven. In these examples, other areas transform more than the areas that are constrained. One way of implementing these examples is to take a square piece of fabric where half of it is woven with a stiffer, more dense weave, and the other half is made with a more flexible and less dense weave. Even with uniform active fibers through the entire fabric, the more flexible/less dense region exhibits greater transformation than the dense/stiff region.

Added Active Material Fibers

In some embodiments, active fibers are incorporated into a woven, knit, or braided pattern to provide a three-dimensional self-transformation upon exposure of the active fabric to a stimulus (e.g., increase or decrease of energy). The thickness, width, strength, flexibility and pattern of the weave, knit, or braid, in relation to the global weave/knit/braid pattern and its flexibility/stiffness, dictates the precise structure produced after transformation.

Typically, the active fiber transforms along a particular axis. For example, the transformation can occur parallel to the length of the fiber or perpendicular to the length of the fiber. Typically, the transformation is an increase or decrease in length of the active fiber, or a curling of the fiber. The axis of activation of the active fiber can influence the type of transformation.

FIGS. 1A-B and 2A-B illustrate two embodiments of active fabrics. In both embodiments, two fibers are woven in a plain weave, in which the two fibers are oriented approximately perpendicular to each other. One of the fibers is a standard flexible fiber, and the other fiber is an active fiber.

In the embodiment of FIGS. 1A-B, the active fiber curls (e.g., rolls, as illustrated) along the length of the fiber. Upon exposure to an external stimulus, pores of the woven material can increase is size or areas of the woven material can become looser.

Figure 2B:
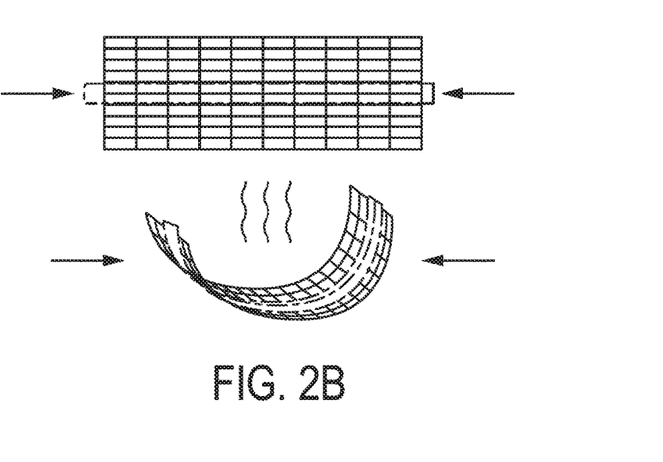
FIG. 2B is a top-down view of the woven material. Upon exposure to an external stimulus, the woven material curls along a surface of the woven material.

In the embodiment of FIGS. 2A-B, the active fiber shrinks along its length upon exposure to heat. After weaving, when the active fabric is exposed to heat, the active fabric curls along the axis of the active fiber due to the shrinkage of the active fiber. After weaving, when the active fabric is exposed to heat, the active fabric curls along the axis of the active fiber due to the shrinkage of the active fiber.

In another embodiment, one of the fibers is a standard flexible (e.g., passive) fiber, and the other fiber is an active fiber that expands perpendicular to its length upon exposure to moisture. This active fiber is woven in a "curled" state where the fiber is curled upon itself perpendicular to its length. The woven structure can be created to be porous with twice the space needed between the active fibers by leaving a gap between fibers, which allows the active fibers to expand and fill the gap. After weaving, when the structure is subject to moisture, the woven structure will not change globally, rather locally, the active fiber will un-curl and close the spacing between fibers such as to close the pores and create water-proofing.

Figure 3A:
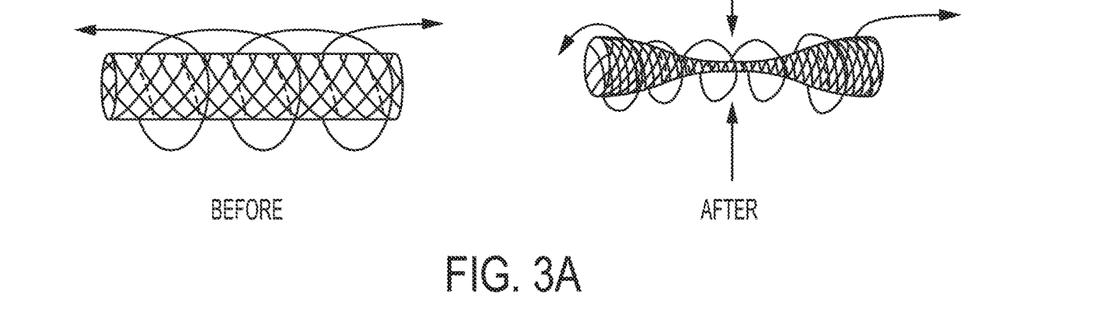
FIGS. 3A-C illustrate three techniques for forming a woven active fabric having a cylindrical shape.

In FIG. 3A, the active fiber shortens along the length of the fiber causing the cylinder to compress in the middle. In an alternative embodiment similar to FIG. 3A, the active fiber curls, causing the cylinder to spiral tighter. In comparing FIGS. 3A and 3B, the active fiber of FIG. 3A can be more tightly wound around the middle section. Alternatively, the active fiber of FIG. 3A is selectively activated so that transformation only occurs in the middle. As another alternative, the two ends of the cylinder are constrained so that they cannot change diameter. As a result, the spiral fiber would have more effect on the middle of the cylinder rather than the ends which are constrained.

Figure 3B:
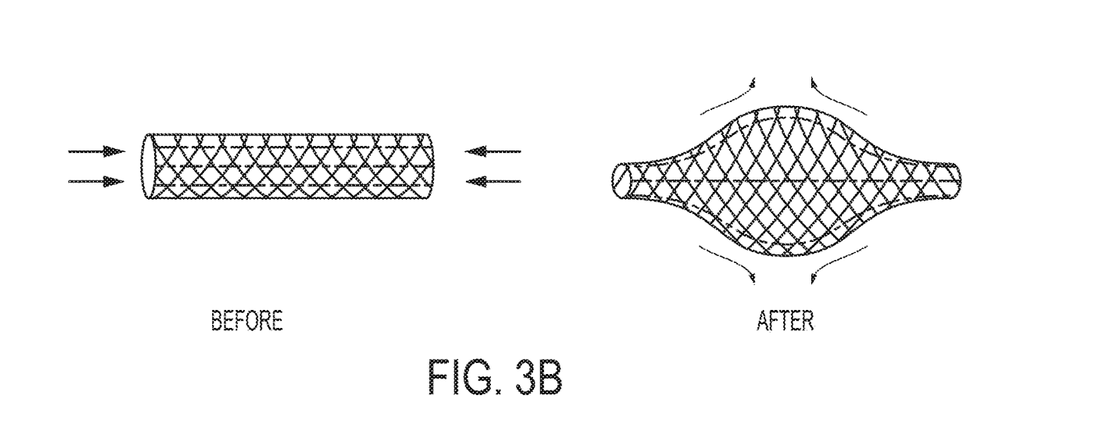
Figure 3C:
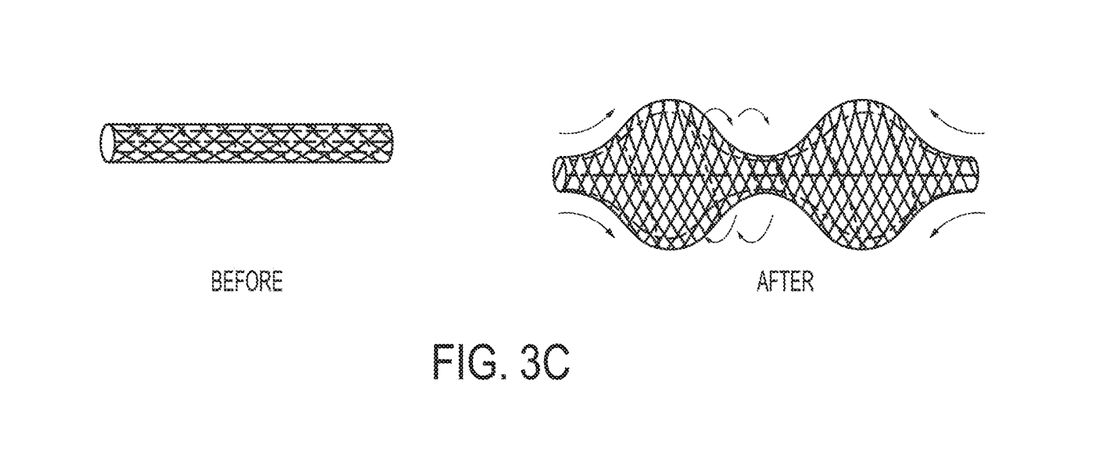
Figure 4A:
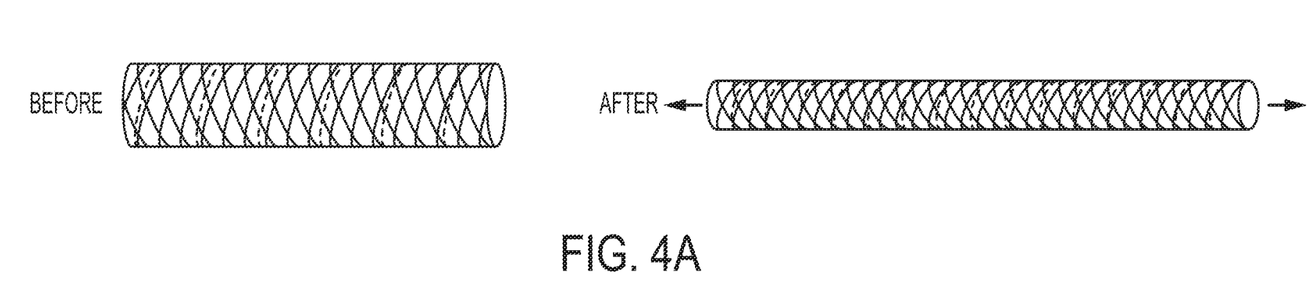
FIGS. 4A-C are illustrations of three different orientations for weaving an active fiber into a woven cylinder. In each of FIGS. 4A-C, the fibers are illustrated prior to activation (Before) and after transformation (After). In each of FIGS. 4A-C, the active fibers shrink, causing a transformation of the shape of the initial cylinder.
Figure 4B:
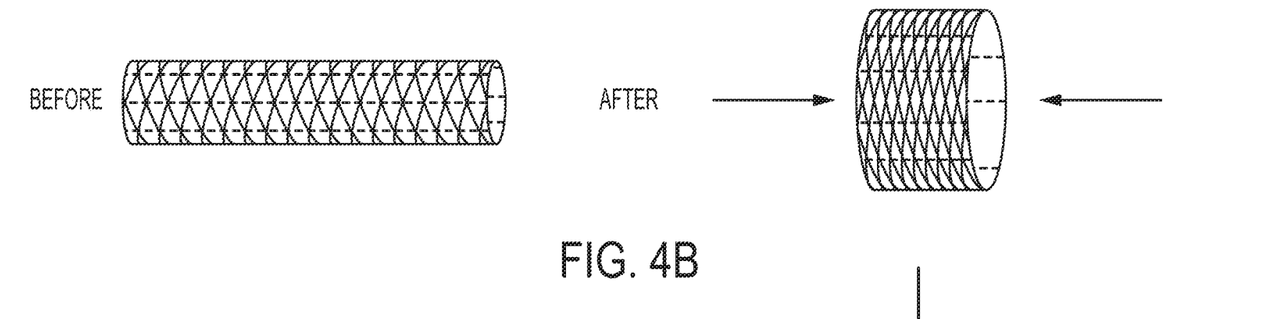
Figure 4C:
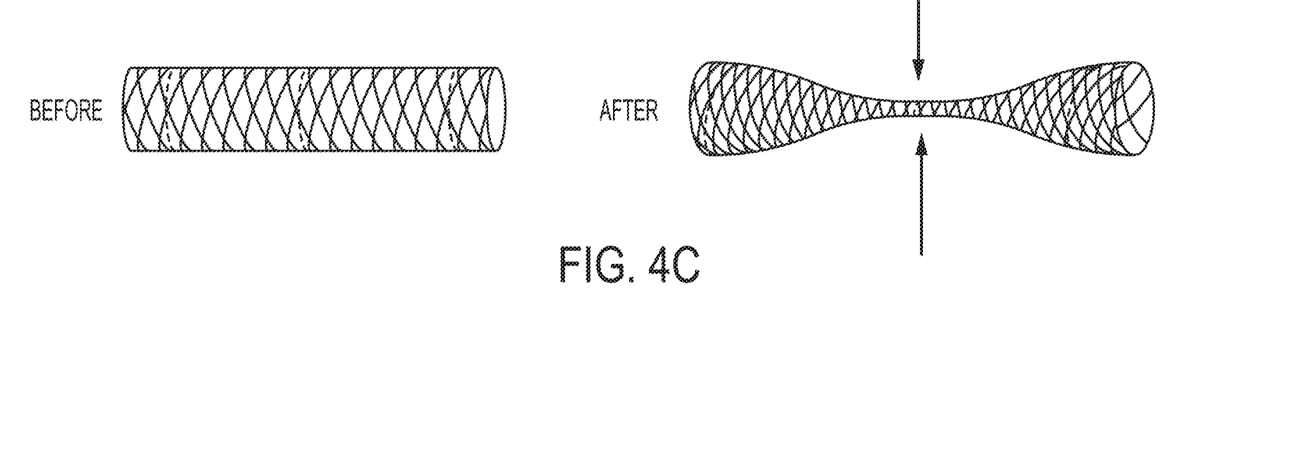

In FIG. 3C, a first active fiber winds around the cylinder (similar to FIG. 3A), and a second active fiber is woven along the cylinder and parallel to the longitudinal axis of the cylinder (similar to FIG. 3B). When the active fibers are transformed, the woven cylinder can both bulge and compress in different zones. The two active fibers in FIG. 3C can be the same or different. Alternatively, only selective regions can be activated (rather than the entire fiber/cylinder), for example, the middle of the wound active fiber could be activated while the two sides of the longitudinal fiber are activated causing the variable bulging and compression. As another alternative, the ends of the cylinders can be constrained so that they cannot change in diameter, causing the cylinder to undulate when the fibers are activated.

Examples of fibers that expand or contract along their length upon exposure to a change in temperature include NYLON, polyethylene (PE), polyvinylidene fluoride (PVDF), polyester, and polytetrafluoroethylene (PTFE).

Examples of fibers that expand or contract perpendicular to their length upon exposure to moisture include cellulose, nylon, and wool.

Examples of fibers that transform upon exposure to light include polystyrene.

Activation

Activation Stimulus

The type, amount, and location where an activation stimulus (e.g., energy) is applied to the active fabric can influence the transformation characteristics based on the pattern and amount of active material.

For example, if a minimal amount of heat-activated fiber is incorporated into the structure and then heat is applied to the entire woven material, a local transformation will occur based on the location and direction of the heat-activated fiber. Portions of the active fabric that do not include an active fiber should not respond to the heat. Only the heat-activated fibers will transform (e.g., shrink), causing local transformation, based on their axis of transformation and their orientation in the woven structure.

If the entire active fabric is created with heat-activated fibers, then a very different transformation can occur if the entire composite is subject to heat. One example is a global curling shape, rather than local transformation. However, if the heat is locally applied to the active fabric, rather than to the entire active fabric, then a local transformation may occur. This demonstrates that the location of the applied energy can directly impact the nature of the transformation (e.g., local vs. global).

The amount of activation can cause different transformation characteristics. For example, if more heat is applied in a short amount of time, the rate of transformation can increase, depending on the active material's characteristics. The length of time the active fabric is exposed to the activation energy can also impact the shape transformation, where a longer exposure to the activation energy can produce a different shape by allowing the material to transform more than if the activation energy was applied only for a short amount of time.

Different types of activation energy, in relation to the active material, can cause different transformation characteristics. For example, water-activated materials often tend to transform more slowly and less repeatably compared to heat-active material. Light-active material typically tend to react more quickly, but the transformation tend to be irreversible or have less force whereas heat-active material may be completely repeatable. The location and type of active material based on the supplied activation energy allows for many different transformations with different activations energies, at different times and should be designed specifically for the application and environment of use.

Resultant Shape Transformation

The three-dimensional shape of a transformed active fabric is a result of the careful design of: 1) the material property of the non-active fiber or fibers; 2) the material property, amount and pattern of the active fiber or fibers; 3) the global pattern of the fabric structure and its local/global constraints; and 4) the amount, pattern and time of supplied activation energy. This relationship can be simplified and easily controlled if a single type of non-active fiber, a single type of active fiber, and a single type of activation energy are used. This leaves only the pattern and quantity of the active fiber, thus the pattern becomes the "program" for creating precise self-transforming woven materials.

Usage

The active fabrics allow for precise control over three-dimensional self-transformations for active fabrics. Complex, precise and pre-determined shapes can be achieved such as material detailing, patterning and fashion/apparel texturing (ripple patterns, tufting, pleating etc) or larger repeatable transformations for comfort (sinusoidal waves, various degrees of positive and negative curvature, cut/vents etc), custom fit or openings (porosity, breathability, waterproofing). This method produces predictable and unique geometric structures from a traditionally passive, flat, woven material opening new opportunities for a variety of products and industrial manufacturing processes.

A sinusoidal structure can be created by alternating the orientation of the curl of the active fiber: top and bottom, top and bottom, along the length of the fabric. Vents are similar to the porosity embodiments except that the fabric can have cuts or slits that allow specific regions to curl open or closed when the active fabric in that region is activated. Changes in water permeability can be implemented by an embodiment where the material closes to minimize holes and stop water and then opens to be breathable again.

Advantages

The active fabrics described herein confer significant advantages compared to traditional methods of making complex geometry, curvature or detailing in flat woven materials. Traditionally, three-dimensional structures of a material are either produced by forcing the material into place with thermo-forming, molding or other manual operations, or the three-dimensional structure is produced by the global pattern of the weave/knit/braid itself. Improved fabrics capable of providing a three dimensional structure are desirable. As described herein, the three-dimensional structure can be produced by self-transformation of active fibers within an active fabric. Thus the active fabric can autonomously create a desired shape when and where the user desires (without manual manipulation). By reducing the manual labor, time and skill required to form woven materials into complex shapes, the active fabrics can provide efficiencies and manufacturing opportunities. The active fabric can now be "smart" and either change shape for performance, comfort or other applications and can change porosity and micro-structure on the fly.

Comparison to Existing Systems

This active fabrics described herein go beyond traditional woven systems as well as traditional smart material sheets to create completely new behaviors in woven or textile structures that can autonomously react to an external environment (e.g., heat, moisture, light, electricity etc). In traditional woven systems passive fibers, strands or other elements are combined to make a textile structure that has passive or mechanical properties, such as stretch, stiffness, or porosity, and does not have active and reversible properties like breathability, shape-transformation, moisture-active water proofing, etc. This active fabrics can provide functional and useful transformation (fiber orientation, weaving pattern, types of active materials vs. passive materials, activation energy, 2D vs. 3D woven structures etc). When an active element is woven in a specific orientation with a specific woven pattern using the correct material, either a local transformation can be created, allowing for smart breathability, porosity, or local shape-transformation, or alternatively, a global transformation can be created where the entire woven surface self-transforms to form around the body or other 3-dimensional complex shape.

Forming & Detailing

Today's manual or automated material forming techniques require significant energy, precision, skill and time to produce unique shapes. Footwear and apparel goods are examples of products that rely on industrial forming techniques to stretch and force material around a physical mold. The physical mold constrains the possible number and complexity of the product since a new mold is needed for each unique product and the molds tend to be expensive, passive and simple due to their CNC-machining process. In contrast, active fabrics described herein allow a single sheet of woven/knit/braided material to self-transform into any arbitrary 2D or 3D structure based a stimulus (e.g., activation energy). In some instances, the mold can be eliminated entirely, reducing the cost and limitations for a single product type. The active fabrics also allows for customizable products to be easily produced and entirely new types of products that would previously not have been possible with a subtractive-milled mold, thus, eliminating the forming or molding techniques entirely.

Comfort and Fit

New products are also now possible that can self-transform and adapt to the user or the type of use and fluctuating environments. Nearly all products are designed to be passive with a single function and fit. For example, shoes or clothing are designed for a single type of use and do not adapt if the user changes from one climate to another, if they start to run versus walk or if they grow or gain/loose weight. Active self-transforming woven materials can now be designed to open or close such as to allow active venting/cooling/heating, transform shape for water proofing or moisture retention and independently morph for added comfort or structure based on the activity. For example, someone might want a loose-fit shirt for everyday use then want a tighter-fit shirt when playing sports. Similar, this shirt may open as the external temperature increases to actively cool the person, or may close when it is cool. The shirt may also open in specific places if the person starts playing a sport or increasing their body temperature. Entirely new product concepts can be created with active self-transforming wovens that can morph their shape or performance based on the user's body, comfort, new design or aesthetic preferences, fluctuating environments and changing functions.

Manufacturing Techniques

Fabrication & Manufacturing: Self-forming techniques may require less energy and may use fewer automated machines. The manufacturing techniques may require less labor and time. Automated process for creating intricate patterns, such as pleating, tufting, and stitching details, can be created with reduced need for manual labor or complex machines. As a results, variable patterns can be formed in 2- or 3-dimensions. Automated process for creating complex curvature (e.g., for the body or foot) without darting, patterning or patching material Performance Surfaces Active self-transforming woven materials can also be designed to create dynamic performance increase—including aerodynamics, moisture control, temperature control or other properties that may create competitive advantage. By controlling the shape and resultant flexibility/stiffness and actuation a dynamic woven surface can transform on an athlete to increase or decrease aerodynamic resistance or breathability for higher performance. Similarly, these woven surfaces could dynamically put pressure in various points of the body to increase blood-flow and create active compression garments for athletic or medical benefits.

Applications

The active woven materials can be used in a variety of applications.

Sports and performance applications include: self-transformation process for custom fit for footwear or apparel; creating aerodynamic or other performances surfaces with highly dynamic complex shapes/textures/patterns; active compression structures/constraints in footwear and apparel to increase athlete performance by controlled blood flow; active cooling, moisture control or breathability for sportswear, footwear and garments; dynamic apparel or footwear for different environments, dynamic body conditions or varied user performance (e.g., running vs. walking).

Fabrication & Manufacturing: Self-forming techniques may require less energy and may use fewer automated machines. The manufacturing techniques may require less labor and time. Automated process for creating intricate patterns, such as pleating, tufting, and stitching details, can be created with reduced need for manual labor or complex machines. As a results, variable patterns can be formed in 2- or 3-dimensions. Automated process for creating complex curvature (e.g., for the body or foot) without darting, patterning or patching material Medical and Health applications include: compression garments with various degrees of compression/tension across the body to help circulate blood flow in custom pathways; dynamic support for enhanced strength, walking or other physical maneuvers—in other words, a tunable woven exoskeleton.

Fashion applications include: new capabilities for designing fashion and apparel with shapes and patterns that were impossible or difficult to produce previously; shape and structure can be produced with single sheets of material rather than underlying structure or multiple patched wovens.

Furniture and interior products applications include: self-transforming furniture or other interior products; woven-based complex and 3-dimensional interior partitions and other wall treatments that can be created to self-transform based on fluctuating environments.

INCORPORATION BY REFERENCE; EQUIVALENTS

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. An active fabric, comprising:
a plurality of fibers, including active and passive fibers that are woven, knitted, or braided together in an arrangement that forms a shape of an article, wherein at least one active fiber is an active material laminated with a non-active material, whereby the at least one active fiber exhibits a change in dimension responsive to exposure to a stimulus, a differential between the change in dimensions of the active and passive fibers producing an autonomous, predefined physical transformation as a function of the arrangement to the shape of the arrangement or the article.

2. The active fabric of claim 1, wherein the external stimulus is heat, moisture, light, cold.

3. The active fabric of claim 1, wherein the external stimulus is a change in temperature.

4. The active fabric of claim 1, wherein the active fibers are present at a portion of the active fabric to produce a local physical transformation.

5. The active fabric of claim 4, wherein the local physical transformation produces a change in porosity.

6. The active fabric of claim 1, wherein the active fabric exhibits a predefined change of porosity at a location of the plurality of fibers.

7. The active fabric of claim 1, wherein the active fiber is present substantially throughout the active fabric, and wherein the active fabric exhibits global transformation responsive to the stimulus.

8. The active fabric of claim 7, wherein the active fabric changes in three dimensions responsive to the stimulus.

9. The active fabric of claim 1, wherein the active material has a bias, based on extrusion direction of the active material, oriented toward a long axis of the active fiber, and wherein the active fiber curls along its long axis.

10. The active fabric of claim 1, wherein the active material has a bias, based on extrusion direction of the active material, oriented toward a short axis of the active fiber, and wherein the active fiber curls along its short axis.

* * * * *